United States Patent

[11] 3,622,908

[72] Inventor Michael L. Skolnick
 Monroe, Conn.
[21] Appl. No. 21,262
[22] Filed Mar. 20, 1970
[45] Patented Nov. 23, 1971
[73] Assignee United Aircraft Corporation
 East Hartford, Conn.

[54] DITHERED GAIN CHARACTERISTIC STABILIZATION OF A GAS LASER
 3 Claims, 2 Drawing Figs.
[52] U.S. Cl. ............................................... 331/94.5
[51] Int. Cl. ............................................... H01s 3/00
[50] Field of Search ..................................... 331/94.5

[56] References Cited
 UNITED STATES PATENTS
 3,495,185  2/1970  Herriott ........................ 331/94.5

Primary Examiner—Ronald L. Wibert
Assistant Examiner—Conrad Clark
Attorney—Melvin Pearson Williams ABSTRACT: A frequency stabilized gas laser having a substantially unmodulated output beam includes, within the optical path of the optical cavity, an absorption cell having a gaseous absorption medium exhibiting the stark effect, the absorption characteristic of the cell being shifted in frequency so that the average Lamb dip frequency is coincident with the primary transition frequency of the laser gain medium, the shift being varied a small amount in an oscillatory fashion around the primary transition frequency so as to provide a dithered net optical output gain characteristic to the laser cavity. The resulting relative variation in optical cavity power extraction is used to adjust the position of one mirror, therefore the length of the cavity and the resonant frequency thereof.

FIG 2
A LASER GAIN CHARACTERISTIC
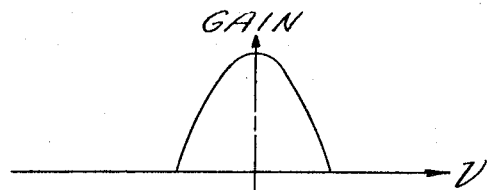
B UNSHIFTED ABSORBER CHARACTERISTIC
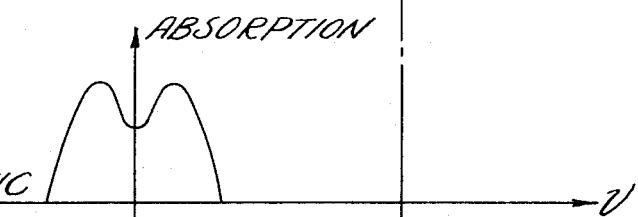
C STARK SHIFTED ABSORBER CHARACTERISTIC
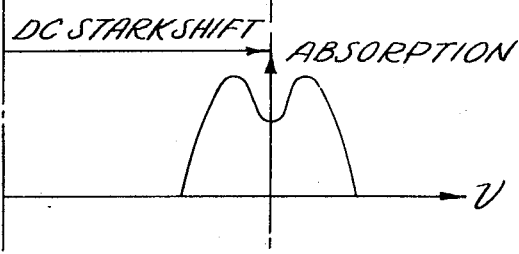
D AC DITHER & DC SHIFTED ABSORBER CHARACTERISTIC
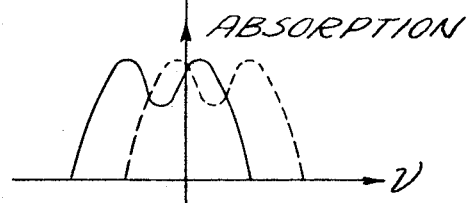
E (A-C) COMBINED GAIN & ABSORBER
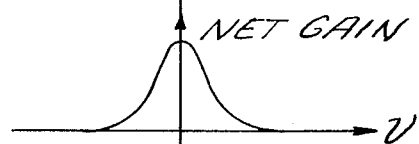
F (A-D) TOTAL DITHERED LASER OUTPUT CHARACTERISTIC
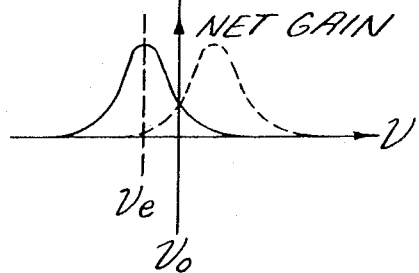

DITHERED GAIN CHARACTERISTIC STABILIZATION OF A GAS LASER

BACKGROUND OF THE INVENTION

1. Field of Invention

This invention relates to gas lasers, and more particularly to the frequency stabilization of the optical output without modulation thereof.

2. Description of the Prior Art

In the prior art, a common arrangement for a control system to carefully regulate the length of the laser optical cavity, and therefore to regulate the exact frequency of the laser output, employs a hill-climbing servo which dithers the position of one of the mirrors of the cavity. This is accomplished by mounting the mirror on a piezoelectric crystal or other transducer, the transducer having an oscillatory voltage applied thereto for the purpose of providing a known minor cyclic variation in cavity length, and the effect of the cavity length oscillations are sensed and compared with the oscillatory driving signal in a synchronous detector. The synchronous detector then provides a discriminant error signal having a magnitude proportional to the difference between the actual cavity length and desired cavity length, and having a polarity indicative of whether the length has become too large to too small. Thus the servo system can drive the mirror position in a direction to tend to maintain the average cavity length constant.

However, most frequency stabilization means known to the prior art have required that the output beam be frequency modulated by some amount in order to determine the sense or direction in which the mirror should be moved to return the cavity length to that desired for the preferred output frequency. In many laser applications, utilization of a frequency modulated output beam, even though its average frequency may be very closely controlled, is undesirable. For instance, in frequency modulated communication systems, this necessarily provides a frequency component in addition to the intelligence component which is desired. Particularly in frequency multiplexed systems, it is obvious that such a system becomes unduly complicated as a result of this modulation. Also in certain sophisticated radar systems employing a laser as the primary source, modulation of the output frequency is undesirable. Further, a primary advantage of the stabilized laser cavity is the utilization of the laser to excite a high powered amplifier; in instances where the amplifier output must be unmodulated, the modulated output frequency stabilized gas laser oscillator is of little value.

SUMMARY OF THE INVENTION

The object of the present invention is to provide an improved, frequency stabilized gas laser having an unmodulated output.

According to the present invention, the frequency of a gas laser is stabilized by adjusting the position of one of the mirrors thereof, control over the adjustment being in response to the effect thereof on laser output power, the sense of variation in output power being determined by dithering the net output power gain characteristic of the laser cavity. In accordance further with the present invention, the laser cavity includes an absorption cell having a Lamb dip, the frequency of which is dithered. In still further accord with the present invention, a stark absorption cell included within the optical gain path of a laser cavity contains an absorption gas medium at low pressure exhibiting a Lamb dip, the average center frequency of which is shifted by a DC voltage applied to the stark absorption cell, the instantaneous center frequency being adjusted by means of a dithering voltage applied to the stark absorption cell. The present invention is capable of providing a frequency stabilized output beam having no frequency modulation.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 2 is an illustration of gain and absorption characteristics in a gas laser employing the present invention.

DESCRIPTION OF THE PREFERRED EMBODIMENT

Figure 1:
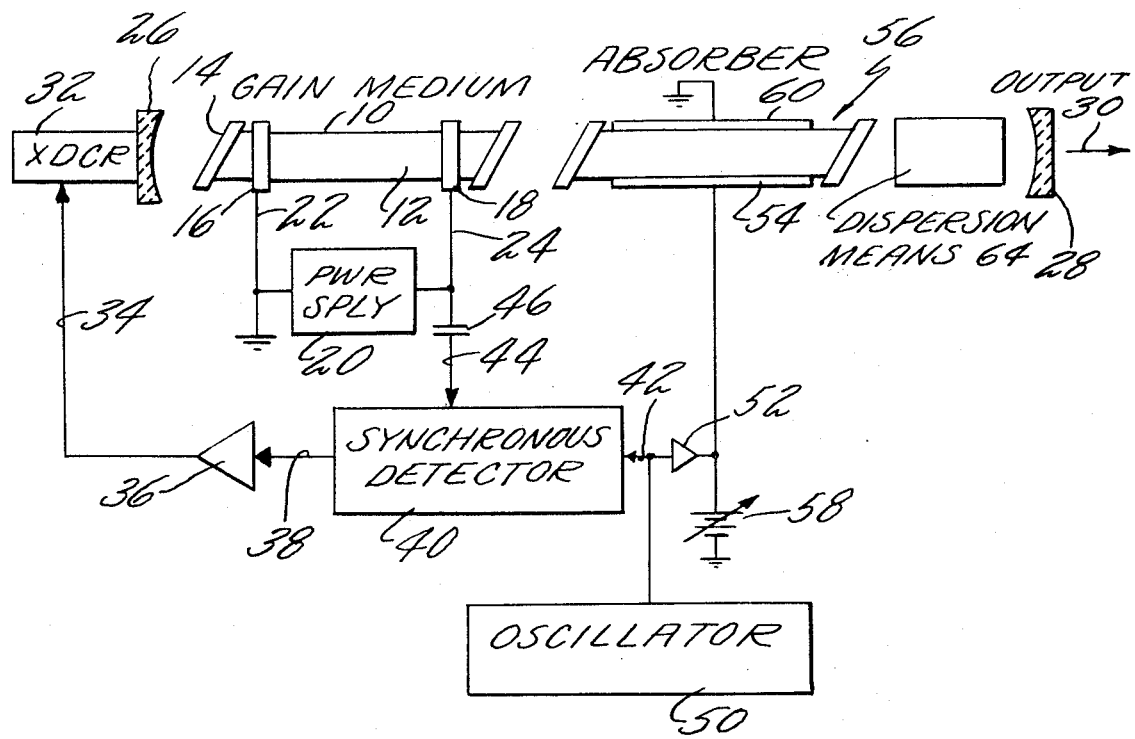
FIG. 1 is a simplified schematic block diagram of a preferred embodiment of the present invention.

Referring first to FIG. 2, illustration A shows the well known laser gain characteristic where gain or output power is maximum at the transition frequency of the laser gain medium. The objective in providing a frequency stabilized laser is to cause the laser cavity to remain at a precise length that coincides with the center frequency of the gain characteristic for the laser medium being employed. For instance, in a $CO_2$ gas laser, a stable laser cavity would cause the cavity to assume dimensions precisely related to one of the spectral transitions near 10.6 microns.

In illustration B of FIG. 2, the absorption characteristic of an absorbing medium displaying the Lamb dip characteristic is illustrated. This is the characteristic that the absorption is saturated near the center frequency of the absorption characteristic; in other words the absorption is maximum at either side of the center frequency and perhaps half of maximum absorption at the exact center frequency of the absorption characteristic. An inhomogeneous absorbing gas at low pressure will generally exhibit this characteristic; for instance, in connection with the present invention, a gas suitable for use with a $CO_2$ lasing medium would be ammonia.

In connection with the present invention, it is necessary that the center frequency of the absorbing medium be matched to the center frequency of the laser gain medium. Further, by combination of the gain characteristic of the gain medium and the absorption characteristic of the absorbing medium, a net optical cavity gain characteristic will result. If the center frequency of the laser gain characteristic shown in illustration A is that of a $CO_2$ laser, and thus at about 10.6 microns, then the absorption characteristic for ammonia at low pressure would be roughly as shown in illustration B of FIG. 2. By applying an electric field to the absorption cell, the stark effect may be utilized to shift the center frequency of the absorption characteristic of the ammonia so that it coincides with the center frequency of the gain characteristic of the carbon dioxide. This shift is illustrated in illustration C of FIG. 2. The stark effect is a well known effect that the center frequency of the absorption characteristic of a gas is a function of the strength of electric field in the gas; in a cell having finite dimensions with conductive plates on opposite sides thereof, this then becomes a function of voltage applied to the plates.

As shown in illustration D of FIG. 2, the center frequency of the absorption characteristic of a stark cell may not only be shifted in a DC fashion, but may be dithered by application of an AC voltage to field-inducing plates. The center frequency would thus vary with time between an upper and a lower frequency in direct proportion to the voltage of an AC signal applied to the field-inducing plates of the stark cell. Illustration E of FIG. 2 shows the net result of combining a stark shifted absorption medium with a laser gain medium in the same optical cavity: specifically, the gain will be significantly reduced at the peaks of the absorption curve, and will have a rather sharp peak at the null of the absorption curve. When the gain is maximum at the same frequency as the relative minimum of the absorption curve, and the relative minimum of the absorption curve has a narrow frequency spectrum relative to the frequency spectrum of the gain characteristics of the laser medium, the net gain shown in illustration E will result. Similarly, if the absorption characteristic is dithered by an alternating stark effect, and this is combined with the laser gain characteristics of the laser gain medium, then the dithered net gain characteristic as shown in illustration F will result. It is this characteristic which is employed in the present invention to provide a frequency stabilized gas laser having an unmodulated output.

Referring now to FIG. 1 a laser chamber 10 encompasses a volume 12 containing a laser gain medium, which for purposes of illustration herein is assumed to be carbon dioxide, either alone or with suitable other gases such as nitrogen and helium, as is known in the art. The laser chamber is fitted with Brewster windows 14, 15 which, as is known in the art, comprise a suitable material (such as sodium chloride for carbon dioxide laser radiation) fitted at the Brewster angle. A pair of electrodes 16, 18 are provided in order to impress voltage across the gain medium, thereby to establish an electric discharge plasma for the purpose of exciting the lasing gas to an upper laser level thereby to promote electromagnetic radiation which comprises the laser output. In the present example, an abnormal glow DC electric discharge plasma is contemplated, and therefore the electrodes 16, 18 are connected to a suitable, constant current, regulated high-voltage DC power supply 20 by appropriate connections 22, 24. The apparatus thus far described provides a laser gain chamber well known to the art. The laser cavity comprises a pair of mirrors 26, 28, the mirror 28 being an output mirror and having hole coupling provides therein or being partially transmissive so as to obtain laser output as indicated by an arrow 30. The mirror 26 is disposed on a transducer 32, preferably an electromechanical transducer such as a piezoelectric transducer or any other suitable transducer known to the art. The transducer 32 is excited by a DC voltage applied over a line 34, the magnitude and polarity of which are controlled so as to tend to maintain the mirror 26 at a precise position that will result in an optical cavity length between the mirrors 26, 28, precisely related to the desired center frequency of the laser output; typically, this is chosen to be the same frequency as the preferred transition frequency of the lasing medium (in this case near 10.6 microns, for $CO_2$). The DC signal on the line 34 may be passed through a suitable filter-amplifier 36 from the output 38 of a synchronous detector 40. The synchronous detector is of the type known in the art for the purpose of providing a signal to a mirror-positioning transducer. The synchronous detector 40 has a reference input 42 and a signal input 44, the DC signal at the output 38 having a magnitude dependent upon the magnitude of the signal input 44 and a polarity which is a function of the difference in phase between the signal input 44 and the reference input 42. The signal input 44 is capacitively coupled to the electrode 14 by a capacitor 46 connected to the lead 24. By providing a power supply 20 which has a constant current characteristic, as the laser output power varies, the impedance variation in the gain medium 12 will result in a change in voltage between the electrodes 16, 18 since the current through the gain medium 12 is held constant. This change in voltage is applied to the signal input 44 as an indication of the effect on laser output power which the positioning of the mirror 26 has caused. This aspect of the present embodiment is disclosed and claimed in my copending application of the same assignee entitled PLASMA TUBE IMPEDANCE VARIATION FREQUENCY STABILIZED GAS LASER, Ser. No. 21,263 filed Mar. 20, 1970.

The reference input 42 is connected to an oscillator 50 which is also connected to an AC amplifier 52, the output of which is connected to a conductive plate 54 disposed at one side of a stark-absorption cell 56. Also connected to the plate 54 is a suitable DC voltage source illustrated herein for simplicity as a battery 58; suitable voltage adjustment may be provided as is known in the art. The battery 58 will provide the DC voltage across the stark absorption cell (between the plate 54 and an oppositely disposed companion plate 60) to create an electric field which will provide the DC stark shift shown in illustration C of FIG. 2. On the other hand, the output of the amplifier 52 provides an AC voltage, thereby to provide a variation in the field between the plates 54, 60 to generate a dithering stark shift as shown in illustration D of FIG. 2. Thus, the center frequency of the absorption characteristic of the absorbing medium within the stark absorption cell 56 is caused to dither about the center frequency of the laser gain medium within the laser chamber 10 by means of suitably adjusting the oscillator 50 and the battery 58.

Illustrated in FIG. 1 is a dispersion means 64. The dispersion means may be employed to select a single transition of the laser gain medium, which otherwise could result in laser radiation at a number of frequencies closely related to the various transition of the gain medium as a result of rotational level splitting, as is known in the art. Such grating dispersion means may take the form of a defraction grating, an etalon, Brewster angle prisms. In any event, techniques known in the art may be utilized so as to limit the oscillations within the cavity formed between the mirrors 26, 28 to a single output frequency. On the other hand, the invention may be practiced without such dispersion means, if desired.

In operation, when the length of the laser cavity, determined by the distance between the mirrors 26, 28, is properly adjusted, the cavity will be operating at the desired center frequency ($\nu_0$, FIG. 2). This being so, as the net gain characteristic dithers back and forth across the center frequency, there is little change in the power output, therefore little change in the impedance of the gain medium 12, and substantially no input at the signal input 44 to the synchronous detector 40. On the other hand, if the mirror 26 were mispositioned so as to lower the center frequency of the optical cavity to a point identified as $\nu_e$ in illustration F of FIG. 2, then as the net gain characteristic dithers around the central frequency $\nu_0$ there is a substantial change in output power of the laser cavity, it varying from substantially minimum to substantially maximum. This results in a concomitant substantial change in the impedance of the laser gain medium within the chamber 10, in turn resulting (with constant current) in a change in voltage between the electrodes 16, 18. This then becomes a synchronous input signal of a substantial magnitude at the signal input 44 of the synchronous detector 40. This signal will bear a phase relationship to the dithering of the net gain which is either positive or negative, due to the fact that the oscillator 50 both causes the dither in the stark absorption cell 56 and provides the reference input 42 to the synchronous detector 40. Thus the input 44 will sense the changes in output power as a result of dithering of the gain curve when the mirror 26 is mispositioned, and will provide a DC voltage at the output 38 which is of a polarity to drive the mirror in the correct direction so as to return the cavity length to a dimension coinciding with the desired output frequency ($\nu_0$) until the input voltage 44 is nulled to zero.

The present invention has an additional advantage. Because the frequency reference is provided by variations in a low-pressure absorption gas (rather than a high-pressure lasing gas) it is sharper and more stable than it is in the case where the control is primarily in the high-pressure multicomponent laser gain medium (as in the case where the output beam is modulated in accordance with the teachings of the prior art). This is due in part to the fact that pressure shifts which occur in the high-pressure laser gain medium do not effect the low-pressure absorption reference employed herein, and because of the lower pressure (in comparison with a high-pressure laser gain medium), a narrower line width and higher stability result.

The embodiment disclosed in FIG. 1 herein employs sensing of variations in voltage between the electrodes 16, 18 as the input to the synchronous detector 40. However, the present invention may be utilized in accordance with teachings of the prior art wherein changes in optical power output are detected by an optical detector directly coupled to the laser output flux. Further, in some gas lasers, in dependence upon the particular absorption gas utilized, an absorption cell may be frequency shifted by means of a magnetic field controlled by the oscillator 50 instead of using the stark effect (variation of the electric field) disclosed herein. Similarly, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. A frequency stabilized gas laser comprising:
   an optical cavity having a pair of mirrors defining an optical path therebetween with an optical gain medium in the optical path;
   an absorption cell disposed in said optical path and containing a gaseous absorption medium exhibiting the Lamb dip;
   an oscillator;
   means responsive to said oscillator for cyclically varying the center frequency of said Lamb dip characteristic; and
   means responsive to the optical output power coupled from said laser cavity and to said oscillator for adjusting the position of one of said mirrors.

2. The frequency stabilized laser according to claim 1 wherein said last named means comprises:
   means responsive to the output power coupled from said laser to develop a feedback voltage;
   a synchronous detector having a signal input and a reference input, said reference input responsive to said oscillator, said signal input responsive to said feedback voltage; and
   an electromechanical transducer disposed on said one mirror and connected to the output of said synchronous detector.

3. The frequency stabilized laser according to claim 1 wherein said absorption cell comprises a stark cell having a pair of electric field inducing plates, said plates being connected to the output of said oscillator and to a DC potential, whereby the instantaneous and average center frequency of said Lamb dip characteristic are controlled as a result of stark effect response to said oscillator and to said DC potential.

* * * * *